United States Patent [19]
Yamaguchi

[11] Patent Number: 5,146,369
[45] Date of Patent: Sep. 8, 1992

[54] DATA COPYING METHOD FOR DISK STORAGE MEDIUM

[75] Inventor: Hirohisa Yamaguchi, Tokyo, Japan

[73] Assignee: TEAC Corporation, Japan

[21] Appl. No.: 679,938

[22] Filed: Apr. 3, 1991

[30] Foreign Application Priority Data

Apr. 4, 1990 [JP] Japan .................................. 2-89459

[51] Int. Cl.$^5$ .............................................. G11B 5/86
[52] U.S. Cl. ........................................................ 360/15
[58] Field of Search ................... 369/84; 360/15, 61, 360/62, 13

[56] References Cited

U.S. PATENT DOCUMENTS 4,707,750  11/1987  Anderson et al. ................... 360/15
5,051,971  9/1991  Yamagishi et al. .................. 360/15

*Primary Examiner*—Vincent P. Canney

[57] ABSTRACT

A data copying method comprises the steps of checking a starting track address and an end track address which are used for controlling a copying of a data from each set of several recorded tracks in a master disk to a slave disk having several unrecorded tracks only so as to store the starting track address and the end track address for each of the recorded tracks, reproducing the data from each of the recorded tracks in the master disk repeatedly for each recorded track to supply a reproduced data signal from the data, and recording and reproducing data signal onto the slave disk at its track addresses corresponding to those addresses of the recorded tracks in the master disk repeatedly for each recorded track in the master disk storage medium, the recording of the reproduced data onto the slave disk being stopped at track addresses of the slave disk corresponding to those addresses of the unrecorded tracks in the master disk.

8 Claims, 9 Drawing Sheets

FIG. 7

DISK EDITING SYSTEM

NO. OF AREAS (MASTER): xxx

| | ID |
|---|---|
| MASTER | |
| SLAVE | xxxxxx |

| AREA INPUT |
|---|
| xxx |

| EDIT KEYS | |
|---|---|
| ← | LEFT |
| → | RIGHT |
| ↓ | DOWN |
| ↑ | UP |
| DEL | CHA. DEL |
| BS | BACK DEL. |
| ENT | ENTER |
| ESC | ESCAPE |

ROLL UP : XX
ROLL DOWN : XX

| AREA | MASTER REF. | | MASTER DESIG | | SLAVE DESIG | |
|---|---|---|---|---|---|---|
| | START | END | START | END | START | END |
| | | | | | | |
| | | | | | | |
| | | | | | | |
| | | | | | | |
| | | | | | | |
| | | | | | | |
| | | | | | | |
| | | | | | | |
| | | | | | | |

| F1 COPY | F2 LINE INSERT | F3 LINE DELETE | F4 DELETE | F5 AREA INPUT | F6 COPY START | F7 PRINT | F10 END |

DATA COPYING METHOD FOR DISK STORAGE MEDIUM

BACKGROUND OF THE INVENTION

The present invention relates generally to a data copying method for a disk storage medium, and more particularly to a method of copying or recording a data recorded in a master disk storage medium onto a slave disk storage medium, the master disk storage medium having a number of unrecorded tracks and a number of recorded tracks in a mixed fashion, the slave disk storage medium having unrecorded tracks only.

Conventionally, there are several kinds of disk storage media (especially, a video disk) which are commonly used to store and record picture information or sound information. In most of such disk storage media, the information is recorded continuously in recording areas from an inner track of the disk to an outer track thereof. However, in a case of a certain disk storage medium, a recording area of the disk storage medium is divided into a plurality of tracks and a disk management data concerning how such disk tracks are assigned in the disk storage medium is already recorded onto a predetermined part of the disk storage medium in a manufacturing stage. For this reason, some recorded tracks may not appear in a successive manner, and recorded tracks and unrecorded tracks often exist in a maixed manner in the disk storage medium.

Usually, a backup disk is prepared as a master disk for storing important information for the users. And, there is a case in which it is required to prepare another backup disk which is a duplicate one of the original backup disk and has exactly the same arrangement of recorded tracks as that of the original backup disk in which recorded tracks and unrecorded tracks exist in a mixed fashion. In such a case, a recording of such important information is made from a master disk storage medium to a slave disk storage medium. In the master disk storage medium, the information is recorded onto a number of tracks at random, and in the slave disk storage medium no information is yet recorded (but, some disk control data concerning track addresses has already recorded in a manufacturing stage). A conceivable method of copying data in this case is to reproduce the information from the master disk storage medium by means of a reproducing unit, and to record a reproduced signal by the reproducing unit onto the slave disk storage medium. However, the reproducing unit usually outputs a signal at a specified level when a reproducing of the data is made at unrecorded tracks of the master disk storage medium. Thus, in a case of this data copying method, there is a problem in that such undesired data is also recorded to tracks of the slave disk storage medium corresponding to the unrecorded tracks of the master disk storage medium. If the slave disk storage medium is a magnetic disk or an erasable optical disk, the undesired data can be deleted later by checking the tracks of the disk where the undesired data is recorded and making a deletion of the undesired data. But, this is inconvenient to the users and additional work must be carried out. If the slave disk storage medium is another type of a recording disk which may be, for example, an addition-recording disk storage medium, it is difficult to produce a duplicate disk having the same track pattern as that of the master disk storage medium.

SUMMARY OF THE INVENTION

Accordingly, it is a general object of the present invention to provide an improved data copying method for disk storage medium in which the above described problems of the prior data copying method are eliminated.

Another and more specific object of the present invention is to provide a method of copying a data from a master disk storage medium having a plural set of recorded tracks and a plural set of unrecorded tracks in a mixed manner onto a slave disk storage medium having unrecorded tracks only, the method comprising the steps of checking a starting track address and an end track address, which are used for controlling a copying or recording of a data from each of the recorded tracks in the master disk storage medium, so as to store the starting track address and the end track address for each of the recorded tracks, reproducing the data from the master disk storage medium repeatedly for each of the recorded tracks to supply a reproduced data signal from the data, and recording the reproduced data signal onto the slave disk storage medium at its track addresses corresponding to those addresses of the recorded tracks in the master disk storage medium repeatedly for each of the recorded tracks in the master storage medium. In the data copying method, the recording of the reproduced data signal onto the slave disk storage medium is stopped at track addresses of the slave disk storage medium corresponding to those addresses of the unrecorded tracks in the master disk storage medium. According to the present invention, it is possible to make easily a duplicate disk storage medium which has exactly the same track pattern as the master disk storage medium in which recorded tracks and unrecorded tracks exist in a mixed manner. Recording of data on the slave disk storage medium is performed on the basis of the track addresses, and a reproduced data can accurately be recorded on the slave disk storage medium. In addition, according to the present invention, it is possible to perform a fast feeding of an optical head when the recording of data is stopped at tracks of the slave disk storage medium corresponding to the recorded tracks of the master disk storage medium. Therefore, a copying time required for data recording onto the slave disk storage medium can be reduced remarkably when compared with that of the conventional data copying method.

Other objects and further features of the present invention will be more apparent from the following detailed description when read in conjunction with the accompanying drawings.

BRIEF DESCRIPTION OF THE DRAWINGS

FIG. 7 is a diagram showing an example of an editing screen which is displayed in the disk editing system when the data copying method of the present invention is performed;

DESCRIPTION OF THE PREFERRED EMBODIMENT

Figure 1:
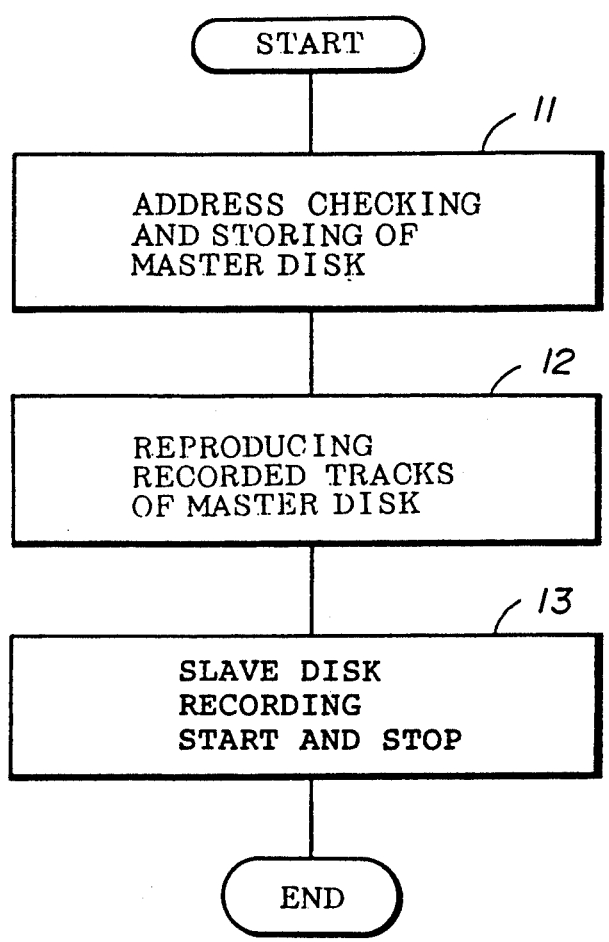
FIG. 1 is a flow chart for explaining a data copying method according to the present invention.

First, a description will be given of the principle of a data copying method according to the present invention, with reference to FIG. 1. As in a flow chart shown in FIG. 1, in a step 11, a starting track address and an end track address of each of a plural set of recorded tracks in a master disk storage medium are checked and the starting and end track addresses are stored for each of the recorded tracks. In the master disk storage medium, there are a plurality of recorded tracks and a plurality of unrecorded tracks in a mixed manner. In a step 12, a data from each of the recorded tracks in the master disk storage medium is reproduced and a reproduced data signal is supplied from each of the recorded tracks. Then, in a step 13, a recording of each reproduced data signal to a slave disk storage medium is made only at its track addresses corresponding to the recorded tracks of the master disk storage medium. And, in this step 13, the above described recording is stopped and no information is recorded at track addresses of the slave disk storage medium corresponding to those addresses of the unrecorded tracks in the master disk storage medium. In the data copying method according to the present invention, only the reproduced data signals from the recorded tracks of the master disk storage medium are recorded to the slave disk storage medium at the track addresses corresponding to the master disk recorded tracks. At the track addresses of the slave disk storage medium corresponding to those addresses of the unrecorded tracks in the master disk storage medium, however, a recording of the reproduced data signals is stopped, and no information is recorded to the slave disk storage medium at those track addresses. Therefore, a plurality of unrecorded tracks remain in the slave disk storage medium at track addresses corresponding to the those addresses of the unrecorded tracks in the master disk storage medium. In addition, according to the present invention, a recording of reproduced data signals on the slave disk storage medium and a stopping of the recording are carried out on the basis of the track addresses of the master disk storage medium, and an accurate data recording on the slave disk storage medium can be performed. And, according to the present invention, a fast feeding of an optical head to a track address of a next recorded track in the master disk storage medium can be carried out while the data recording on the slave disk storage medium is stopped, and therefore a copying time required for the data recording can be reduced remarkably.

Figure 6:
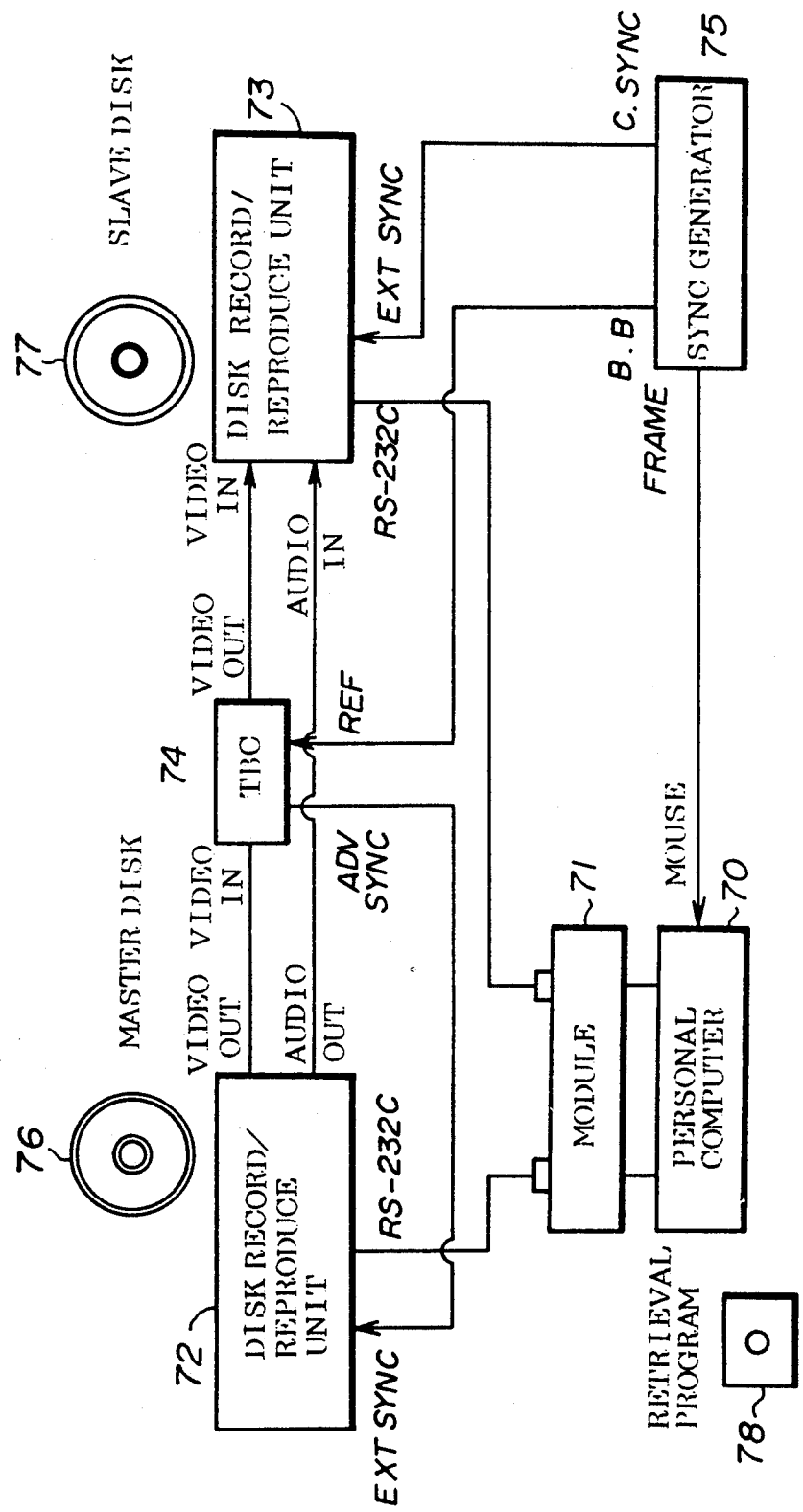
FIG. 6 is a diagram showing a construction of a disk editing system to which the present invention may be applied.
Figure 8:
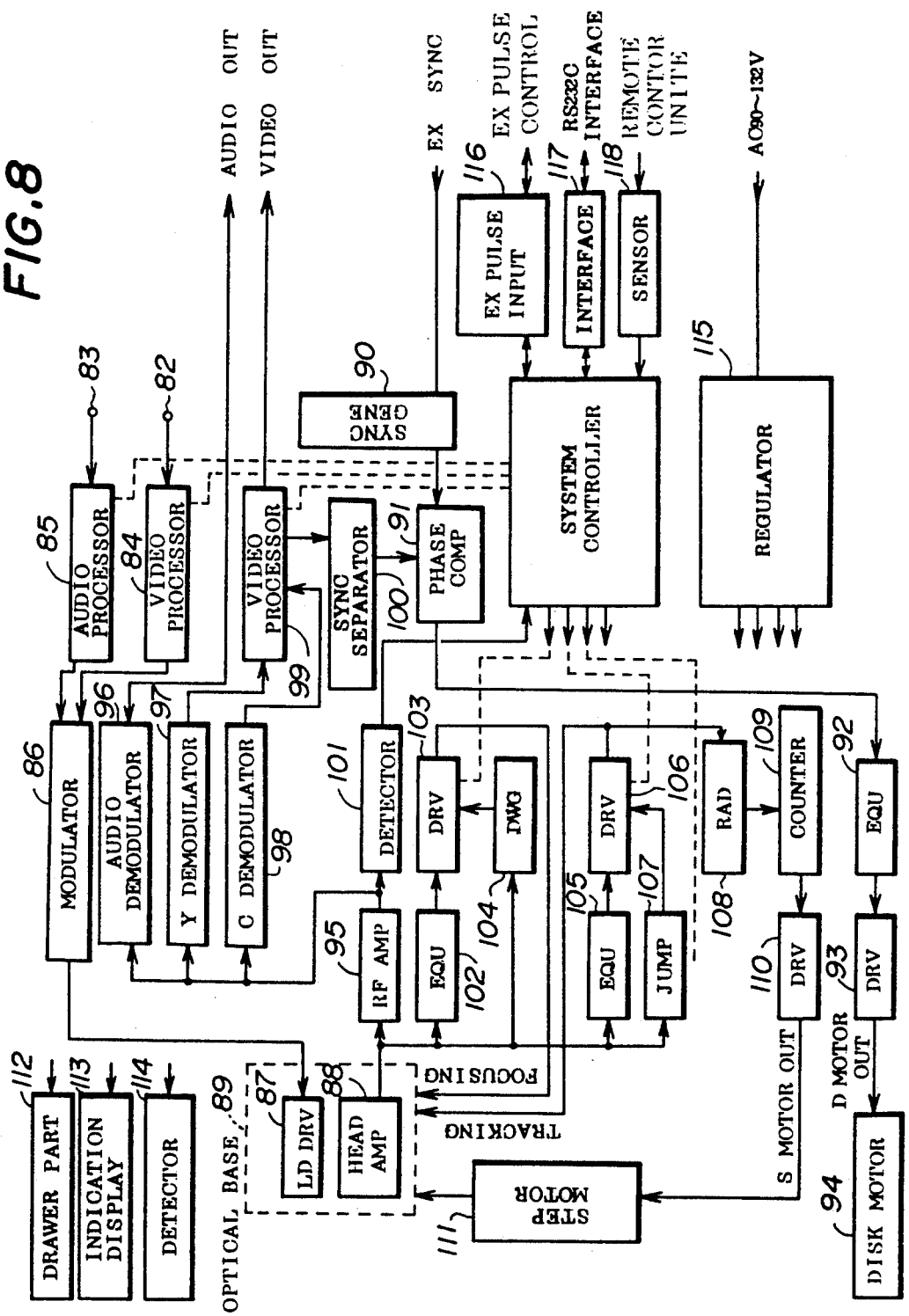
FIG. 8 is a block diagram showing a construction of an essential part of the disk editing system shown in FIG. 6.

Next, a description will be given of an embodiment of a disk editing system to which the present invention may be applied, with reference to FIGS. 6 through 8. In this disk editing system as shown in FIG. 6, a personal computer 70 is connected to two disk recording/reproducing units 72, 73 via a module 71. A time base correc tor (TBC) 74 is connected to a signal transmitting line which links the disk recording/reproducing unit 72 to the disk recording/reproducing unit 73. And, a synchro signal generator 75 is provided to send several synchro signals to the personal computer 70 and the disk recording/reproducing units 72, 73.

The disk recording/reproducing unit 72 is provided to replay a master optical disk which is inserted in the disk recording/reproducing unit 72. The master optical disk is usually an optical disk having recorded tracks where a certain form of data is already recorded. An advanced synchro signal for jitter correction is supplied from the TBC 74 to an external synchro input terminal of the disk recording/reproducing unit 72. This disk drive unit 72 is connected to the module 71 by a suitable data path which is in conformity with the so-called RS-232C interface for enabling an interactive operation with the personal computer 70 via the module 71. The disk recording/reproducing unit 73 is provided for recording a data signal, inputted from the TBC 74, onto a slave optical disk which is inserted in the disk recording/reproducing unit 73. The slave optical disk is usually an optical disk which includes only unrecorded, fresh tracks in which no data is recorded except for some address tracks prepared in manufacturing stages of an optical disk. A composite synchro signal is supplied from the synchro signal generator 75 to an external synchro input terminal of the disk recording/reproducing unit 73. The disk drive unit 72 is connected to the module 71 by a data line conforming to the so-called RS-233C interface for enabling an interactive operation with the personal computer 70 via the module 71. The synchro signal generator 75 supplies a B.B. signal to the TBC 74, this B.B. signal being a reference signal for actuating operation of the TBC 74. The synchronizing signal generator 75 supplies also a FRAME signal to a terminal MOUSE of the personal computer 70.

In the personal computer 70, the operations and actions of the disk editing system are controlled by executing a disk editing program 78. Some typical operations of the disk editing system will be described later with reference to FIGS. 2 through 5. An editing screen, as illustrated in FIG. 7, is displayed on a display unit (not shown) provided with the personal computer 70 to facilitate the work of an operator when he carries out a copying or recording of information already recorded on the master optical disk 76 to the slave optical disk 77.

Replay data signals which are reproduced by the disk recording/reproducing unit 72 from the master optical disk 76 are a video signal and an audio signal. The video signal is supplied from a video output terminal VIDEO OUT of the disk recording/reproducing unit 72 to the TBC 74. After a jitter in the video signal is corrected, the video signal is inputted by the TBC 74 to a video input terminal VIDEO IN of the disk recording/reproducing unit 73. In the disk recording/reproducing unit 73, the data from the master optical disk 76 is recorded onto the slave optical disk 77 at the corresponding track address. As shown in FIG. 6, the audio signal from the master optical disk 76 is transferred to the slave optical disk 77 without passing through the TBC 74.

The disk recording/reproducing units 72, 73 preferably have the same construction. FIG. 8 shows an example of the construction of the disk recording/reproducing units. In FIG. 8, there are shown a system controller 81, a video signal input terminal 82 and an audio signal input terminal 83. An external video input signal inputted to the terminal 82 is supplied to a modulator 86 through an audio processor 85. An external audio input signal inputted to the terminal 83 is supplied also to the modulator 86 through an audio processor 85. The external video input signal and the external audio input signal are each modulated by the modulator 86 into a signal having a prescribed signal form, and these modulated signals are supplied to a laser diode driver LD DRV 87. The LD DRV 87 applies a drive signal to a laser diode (LD) so that a laser light is emitted from the laser diode, this laser light having an optical intensity which is varied in accordance with the information being inputted. A recording of information to an optical disk (not shown) is carried out by a laser light irradiated from the laser diode to the optical disk.

An optical disk in the disk recording/reproducing unit 72 or 73 is rotated by a disk motor 94 in synchronism that is attained by a synchro signal being supplied to the disk motor 94, this synchro signal being transmitted from a synchro signal generator 90 to the disk motor 94 through a phase comparator 91, an equalizer 92 and a driver 93, respectively. The LD DRV 87, together with a head amplifier 88, is mounted on an optical base 89, and this optical base 87 being transported by a step motor 111 in a prescribed transport direction while a recording is made.

When a reproduction or replay is performed with the optical base 89, a change in optical intensity of a reflected laser light reflected from an optical disk, which is scanned in a main scan by a laser light emitted from the laser diode, is detected to produce a replay RF signal, and this replay RF signal is supplied to three demodulation parts including an audio demodulator 96, a Y demodulator 97 and a C demodulator 98 through the head amplifier 88 and a RF amplifier 95. An audio signal, an intensity signal and a color carrier signal are respectively demodulated by the audio demodulator 96, the Y demodulator 97 and the C demodulator 98. A reproduced intensity signal and a reproduced color carrier signal are supplied to a video processor 99, and the video processor 99 supplies a color video signal having a prescribed signal form, and this color video signal is supplied to a synchro separator 100 in which a synchro signal is separated from the color video signal. And, such a synchro signal is supplied to a phase comparator 91.

Meanwhile, the replay RF signal is also supplied to a RF detector 101. After a RF signal detection is made by the RF detector 101, a RF signal is supplied to the system controller 81. Another replay RF signal produced based on a reflected laser light reflected from the optical disk when it is scanned by a different laser light which is different from the laser light which is scanned by a main scan. A focusing servo circuit is formed by an equalizer 102, a driver 103 and a drawing circuit 104, and this focusing servo circuit allows a laser light from the laser diode to converge on the optical disk, in accordance with the signal produced by the head amplifier 88 from such a replay RF signal. The drawing circuit 104 operates when the focusing servo circuit is drawn. As the driver 103 is subject to oscillation at a prescribed time period when a loop of the focusing servo circuit is closed, a peak output voltage from the head amplifier 88 at that timing is detected by the drawing circuit 104, so that the oscillation of the driver 103 is eased and a focusing servo loop is closed without difficulty.

A tracking servo circuit is formed by an equalizer 105, a driver 106 and a jump circuit 107, and an output signal from the head amplifier 88 is supplied also to this tracking servo circuit. This tracking servo circuit converts the output signal into a tracking error signal and sends this tracking error signal back to the optical base 89. Both the focusing servo circuit and the tracking servo circuit operate not only in a replay mode but also in a recording mode. In addition, an output signal from the driver 106 is supplied to a step motor 111 through a radial control circuit 108, a counter 109 and a driver 110, and the operation of the step motor 111 is controlled by this output signal. The driver 110 outputs a drive signal for driving a rotation mirror. When this drive signal outputted by the driver 110 has a level exceeding a prescribed level, the radial control circuit 108 controls the step motor 111 to operate so that the optical base is moved in a radial direction of an optical disk, thereby adjusting a movement of the rotating mirror so as to rotate the rotating mirror around a neutral position at all times.

A detector 114 detects an insertion of an optical disk showing that the optical disk is inserted in the drawer part after a disk tray is closed, and supplies an insertion detect signal to a drawer part 112. In accordance with the insertion detect signal being supplied, the drawer part 112 is operated to lower the disk tray so as to clamp the inserted optical disk on a turntable of a disk drive unit. The detector 114 detects also a depression of an ejection button showing that the ejection button is depressed for ejection of the optical disk, and supplies an ejection detect signal to the drawer part 112. In accordance with the ejection detect signal being supplied, the drawer part 112 is operated to raise the disk tray so as to eject the optical disk out. The operation modes of the disk recording/reproducing units are displayed on an indication display 113.

A regulator 115 is provided to supply a d.c. voltage from an a.c. power supply (90 to 132 V a.c.) to several parts of the disk editing system. The system controller 81 has a central processing unit (CPU) and is so arranged that several signals are supplied to the system controller 81 from an external pulse input part 116, an interface part 117 and a sensor 118.

Figure 2:
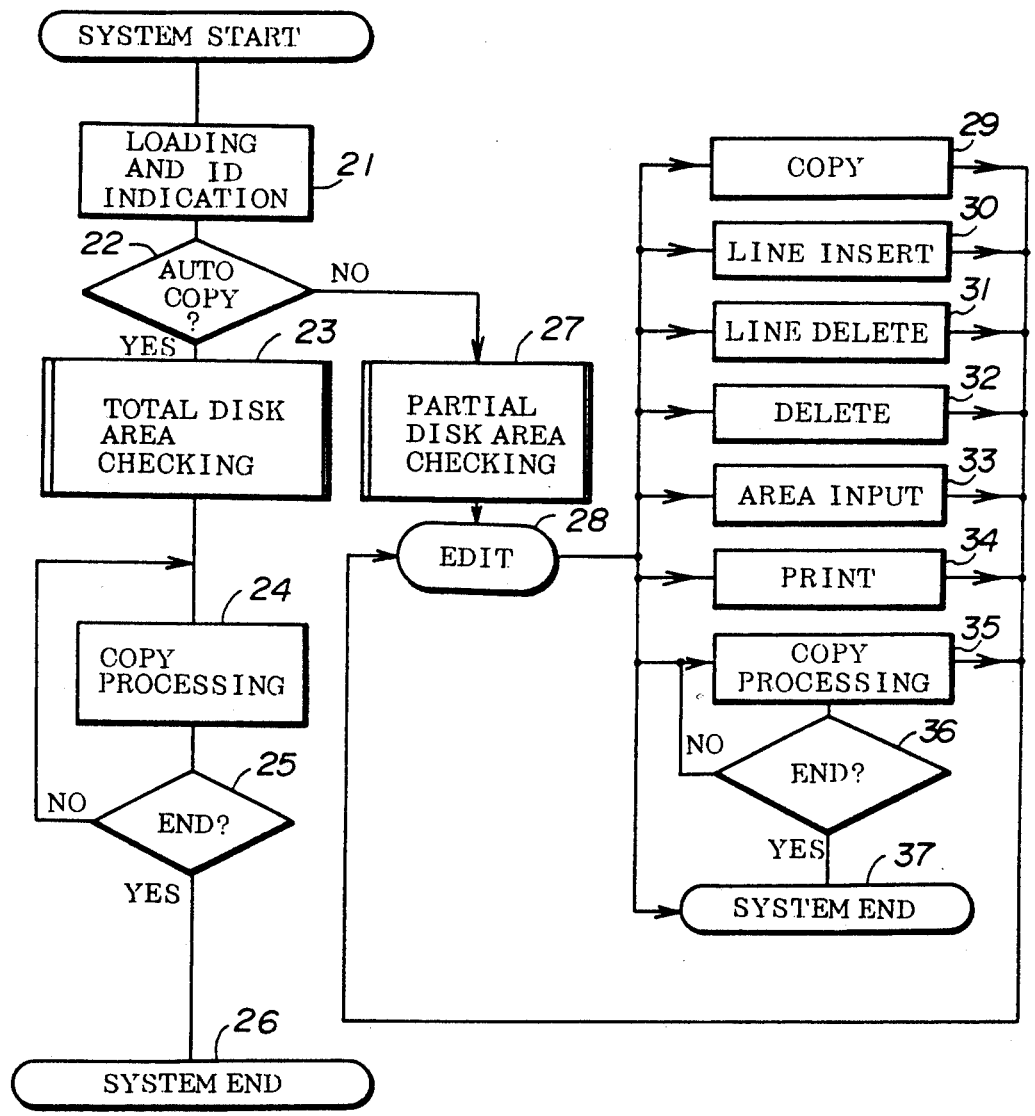
FIG. 2 is a flow chart for explaining the procedure of an embodiment of the data copying method according to the present invention.

Referring next to FIG. 2, a description will be given of an embodiment of a data copying method according to the present invention, the procedure of this data copying method being controlled by the personal computer 70 shown in FIG. 6. A floppy disk in which the retrieval program 78 shown in FIG. 6 is stored is placed in a disk drive part of the personal computer 70 and a power switch of the personal computer 70 is switched ON, then the software system is loaded in a step 21 as shown in FIG. 2. The disk recording/reproducing units 72, 73 each start a reproducing of information stored up to a track address 1 of each of the master and slave optical disks 76, 77, and an identification ID is displayed on the display screen as shown in FIG. 7 through the reproduction of the ID data already stored in the master and slave optical disks 76, 77. And, the disk recording/reproducing units 72, 73 are in a waiting state with the recording/reproducing heads thereof being placed at the track address 1 of each of the disks 76, 77.

In a step 22 in FIG. 2, the personal computer 70 sends an automatic copying message to the screen shown in FIG. 7, indicative of whether an automatic copying according to the present embodiment of the invention is carried out or not. And the personal computer 70 is placed in a waiting state in which an input of the operator's instruction is awaited. If the automatic copying is selected by the operator, a step 23 shown in FIG. 2 is next performed. In the step 23, the disk recording/reproducing unit 72 is controlled to perform a total disk area checking or retrieval of the recorded tracks of the master optical disk 76.

Figure 3:
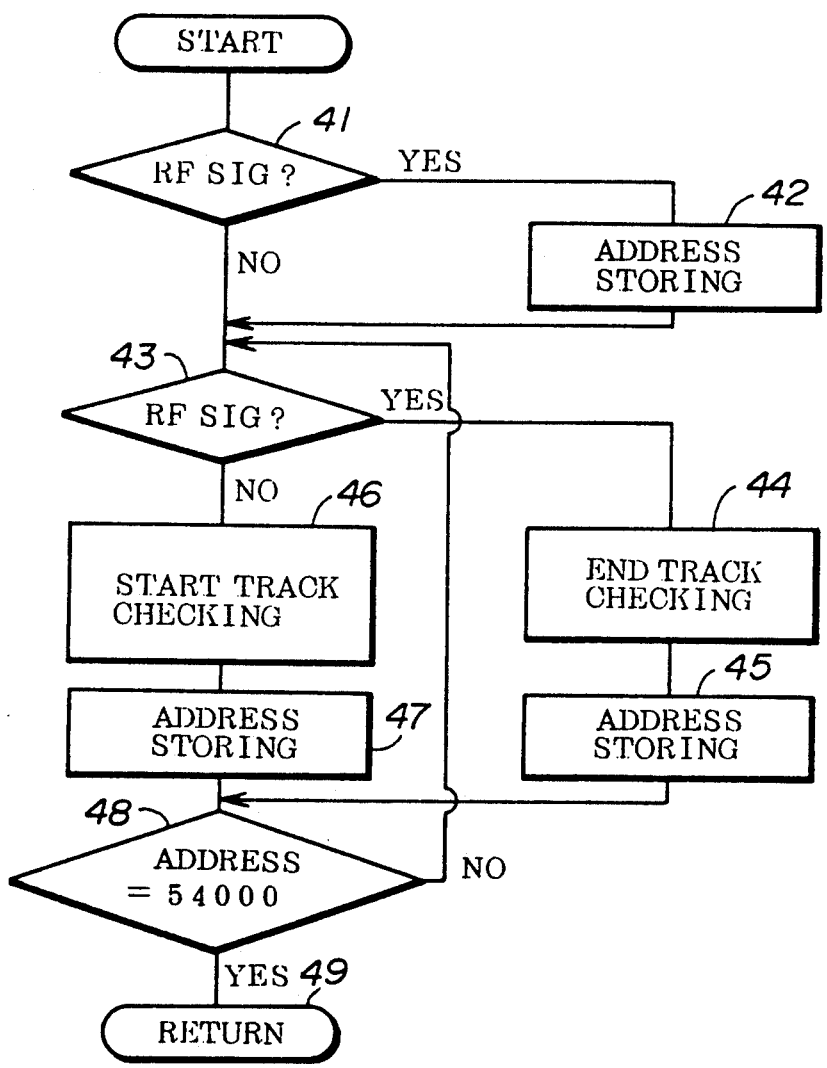
FIG. 3 is a flow chart for explaining the procedure of an essential part of the embodiment shown in FIG. 2.

The total disk area checking in the step 23 above is preset so as to start the replay of the master optical disk always from the track address 1 thereof which shows a starting edge part of the recording areas of the master optical disk, and this total disk area checking is performed in accordance with a subroutine the flow chart of which is shown in FIG. 3. In a step 41 as shown in FIG. 3, a discrimination is made as to whether a replay RF signal is present when the data in the recorded track of the master optical disk is reproduced in the total disk area checking is performed. If a replay RF signal is present, as indicated by "Y" in FIG. 3, in the step 41 when the data at the track address 1 of the master optical disk 76 is reproduced, then a start address of the recorded areas is found at the track address 1 of the master optical disk 76 and this track address is stored in a step 42 shown in FIG. 3.

When a track address storing in the step 42 is completed, or when no replay RF signal is found in the step 41 as indicated by "N" in FIG. 3, a discrimination is again made as to whether a replay RF signal is present or not in a step 43. If a replay RF signal is present in the step 43, then an end track address of the recorded area of the master optical disk 76 is checked or retrieved in a step 44, and such an end track address of the recorded areas is stored in a step 45. If no replay RF signal is found in the step 43, then a start track address of the recorded areas of the master optical disk 76 is checked in a step 46, and such an end track address of the recorded areas is stored in a step 47.

Figure 9:
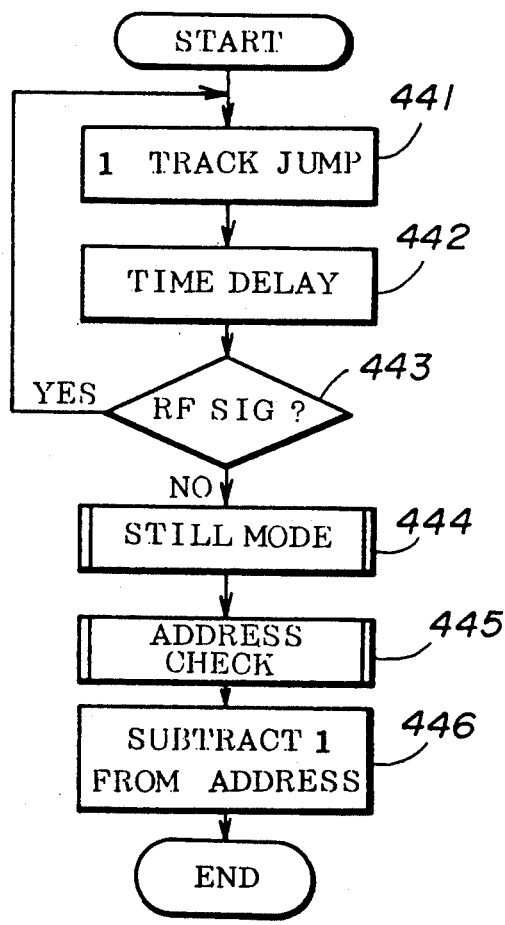
FIGS. 9 and 10 are flow charts for explaining an end track checking subroutine and a start track checking sub outine, respectively, which are carried out by the parts of the disk editing system shown in FIG. 3.

FIG. 9 is a flow chart for explaining the procedure of the end track checking which is carried out in the step 44 as shown in FIG. 3. In a step 441 shown in FIG. 9, a one track jump is made from the current track to a second track of the optical disk and the data recorded at the second track of the master optical disk to which such a track jump is made is reproduced. There is a very short time delay in a step 442, which is required for the RF detector 101 until the operation thereof becomes stable. After this time delay in the step 442, a discrimination is made as to whether a replay RF signal is present when the second track reproduction is made in a step 443. If a replay RF signal is present in the step 443, then the above steps 441 to 443 are repeated until no RF signal is found when a track reproduction is made. Once a discrimination is made that no replay RF signal is found, the personal computer 70 controls the disk recording/reproducing unit 72 in a still mode in a step 444. A reproduction of the data at the unrecorded track where no replay RF signal is found in the step 444 is made again, and the address of that unrecorded track is checked in a step 445. In a step 446, the address of the final track of the recorded areas of the master optical disk is calculated by subtracting 1 from the thus checked address of the unrecorded track.

Figure 10:
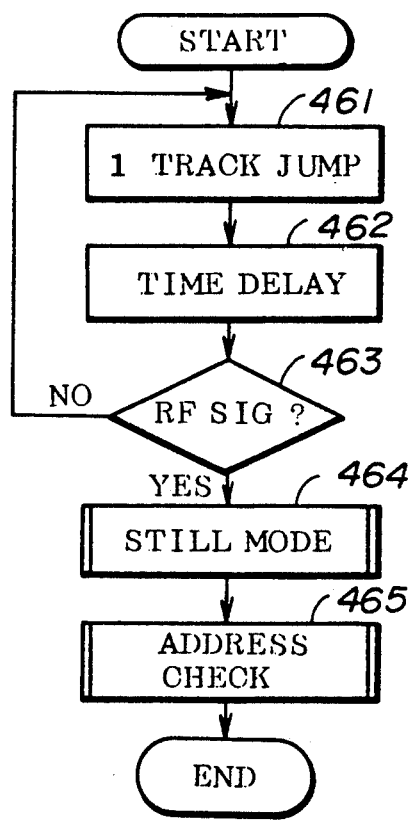

And, in accordance with a flow chart shown in FIG. 10, the start track checking as in the step 46 shown in FIG. 3 is carried out to check a starting position of the recorded areas of the master optical disk. In a step 461 shown in FIG. 10, a one track jump is made from the current track to a second track of the optical disk and the data recorded at the second track of the optical disk to which such a track jump is made is reproduced. Similarly, there is a very short time delay required for the RF detector 101 in a step 462. After this time delay in the step 462, a discrimination is made as to whether a replay RF signal is present when the second track reproducing is made in a step 463. The above steps 461 to 463 are repeated until a RF signal is found when a track reproduction is made. Once a discrimination is made that a replay RF signal is found, the personal computer 70 controls the disk recording/reproducing unit in a still mode in a step 464. The data at the first recorded track where a replay RF signal is first found following the unrecorded tracks in the step 464 is made again, and the address of the starting recorded track is checked and determined in a step 465.

In this manner, either the end track of the recorded areas being checked in the step 44 (as in the flow shown in FIG. 9) or the starting track of the recorded areas being checked in the step 46 (as in the flow shown in FIG. 10) is stored in a step 45 or in a step 47 as shown in FIG. 3. Next, in a step 48, a discrimination is made as to whether the thus stored track address is equal to the maximum track address "54000" of the optical disk. If it is not equal to the maximum track address "54000", then the above steps 43 to 48 are repeated until it is equal to "54000". When making a discrimination as to a recording data is recorded or unrecorded for all the tracks included in the master optical disk 76 is completed, or the subroutine of the total disk area checking shown in FIG. 3 is ended, and then the procedure is returned back to the main routine shown in FIG. 2.

In a copying step 24 in the main routine shown in FIG. 2, a reproduction of the master optical disk 76 is again made starting from the track address 1 and a reproduced data signal is supplied from the master optical disk 76 to the disk recording/reproducing unit 73 in which the slave optical disk 77 is inserted. And, in this copying step 24, tracks included in the slave optical disk 77 are respectively compared with one among the recorded tracks in the master optical disk 76 already checked in the step 23 above. When a track address of the slave optical disk 77 accords with that of the recorded tracks in the master optical disk 76, the disk recording/reproducing unit 73 is controlled so as to supply a high intensity of a laser beam, used normally during a data recording, to the slave optical disk 77 at the accorded track address thereof to carry out a data copying of the data to the slave optical disk 77. When a track address of the slave optical disk 77 accords with that of the unrecorded tracks in the master optical disk 76, the disk recording/reproducing unit 73 is controlled and changed so as to supply a low intensity of a laser beam used during a data reproducing, and this data recording by the disk recording/reproducing unit 73 is stopped. At the same time, an optical head of the disk recording/reproducing unit 73 is moved to carry out a fast search of the slave optical disk to search for the first track in the following recorded tracks of the slave optical disk 77. In accordance with this fast searching movement of the optical head of the unit 73, an optical head of the disk recording/reproducing unit 72 is also moved to the corresponding track of the master optical disk 76.

A similar procedure to the above described one is repeated until the information from all the tracks of the master optical disk is recorded onto the corresponding tracks of the slave optical disk, and a discrimination is made that the complete procedure is ended in a step 25. After this step 25 is ended, the data copying procedure is completed as in a step 26 shown in FIG. 2

As in the foregoing, in the slave optical disk 77, the same track pattern as that of the master optical disk 76 including a plural set of recorded tracks is formed, and unrecorded tracks still remain in the slave optical disk 77 at positions corresponding to the unrecorded tracks in the master optical disk 76. Thus, even when an addition-recording type optical disk is used as the slave optical disk 77, no data signal is recorded at positions corresponding to the unrecorded tracks of the master optical disk 76, and a recording of data can be made later additionally at the positions of the slave optical disk 77 corresponding to the unrecorded tracks in the master optical disk 76. In addition, according to the present invention, a fast searching or feeding of the optical head can be performed by moving quickly the optical head of the optical base 89 when the recording of data is stopped at an unrecorded track area between an end track address of a recorded track and a starting track address of a next recorded track. Hence, it is possible to reduce remarkably a copying time required for data copying procedure when compared with the conventional data copying method.

Figure 4:
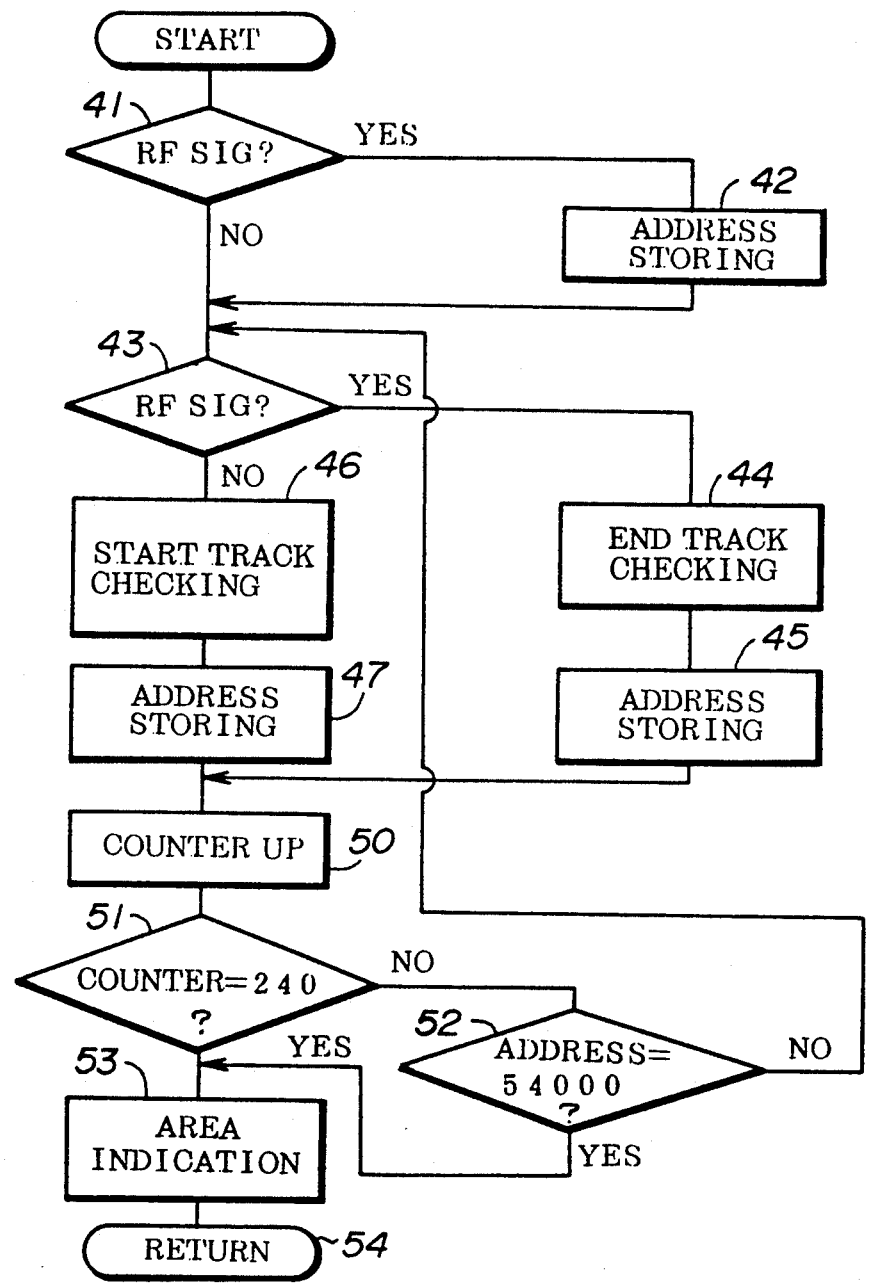
FIG. 4 is a flow chart for explaining the procedure of an essential part of the embodiment shown in FIG. 2.

In a case in which the automatic copying mode is not selected in the step 22 shown in FIG. 2, a partial disk area checking is carried out in a step 27 shown in FIG. 2. This partial disk area checking is carried out in accordance with a flow chart as shown in FIG. 4, and in this partial disk area checking, a part of the plural set of recorded tracks in the master optical disk 76 is checked. In FIG. 4, those steps which are the same as those corresponding steps shown in FIG. 3 are designated by the same reference numerals, and a description thereof will be omitted. After the address storing step is completed in the step 45 or in the step 47, a count-up is performed to increment the value of the counter by 1 in a step 50. And, in a step 51, a discrimination is made as to whether the value of the counter does reach the level of "240" or not. If the value of the counter does not exceed "240", then a discrimination is made as to whether the stored track address does reach the maximum track address of "54000" or not. The steps 43 through 51 are repeated until the stored track address does not exceed the maximum track address of "54000". In this manner, each time a starting track address of the recorded tracks or an end track address of the recorded tracks is stored, the value of the counter is incremented by 1. When the value of the counter reaches "240" (or, the number of recorded areas is equal to "120") in the step 51, or when the maximum track address of "54000" is detected in the step 52, an indication of the recorded areas in the optical disk is displayed on the screen of the disk editing system shown in FIG. 7, in a step 53. Then, the procedure is ended and returned back to the editing step 28 in the main routine shown in FIG. 2. The maximum number of recorded areas which can be displayed on the screen shown in FIG. 7 is 15.

In the editing step 28 shown in FIG. 2, a disk editing is carried out by an operator. In this editing step 28, the operator designates a starting track address and an end track address of a recorded area in the master optical disk 76 containing a data to be copied by inputting a designation data to corresponding portions in a master designation column of the displayed screen using cursor control keys and ten keys while viewing a master reference column of the displayed screen. The operator inputs also a designation data to corresponding portions of a slave disk designation column by using the cursor control keys and the ten keys, the designation data indicating a starting track address of the slave optical disk 77 where the data copying is started. Once the designation data of a starting track address is inputted to the slave disk designation column, an end track address is automatically calculated and displayed on the corresponding portion in the slave disk designation column by the personal computer 70.

And, using a number of function keys F1 through F10 on the personal computer 70, the operator can input several kinds of functions for carrying out a specific editing job. As shown in FIG. 2, these functions include a copy function in a step 29, a line insert function in a step 30, a line delete function in a step 31, a delete function in a step 32, an area input function in a step 33, a print function in a step 34, a copy processing function 35, and a system termination function in a step 37, and the operator can select freely any of these functions during the disk editing. When the copy function in the step 29 is selected by depressing the function key F1, a copying is carried out so that the data recorded in the master optical disk 76 at designated starting track addresses and end track addresses indicated in the master disk reference column of the screen shown in FIG. 7 is automatically copied to the slave optical disk 77 at corresponding addresses. As this data copying is carried out, the designation data which is the same as in the master reference column is also indicated in the master disk designation column and in the slave disk designation column. This copy function facilitates the input operation by the operator, and a data copying can be easily done.

The line insert function in the step 30 is a function which carries out an insertion of a blank data in a single line into a line indicated by a cursor on the disk editing screen shown in FIG. 7. The line delete function in the step 31 performs a deletion of a recorded data in a line indicated by the cursor. In this line delete function, the values displayed in the master disk reference column are not deleted. The delete function in the step 32 performs a deletion of all the values displayed in the master disk designation column and in the slave disk designation column, except for those in the master disk reference column. The area input function in the step 33 carries out an indication of recorded area number starting from a designated area number up to fifteen recorded areas by inputting the starting area number designation data to a prescribed area input box as shown in the screen in FIG. 7. The maximum number of recorded areas where a data can be recorded in the master optical disk is 120 in the present case, but only the area number data of up to fifteen recorded areas can be displayed on the screen shown in FIG. 7 at the same time. For this reason, by inputting a desired area number designation data to the area input box, fifteen recorded area numbers are displayed on the screen shown in FIG. 7 by means of this area input function. And, the print function in the step 34 performs a printing of a displayed data on the screen shown in FIG. 7.

Figure 5:
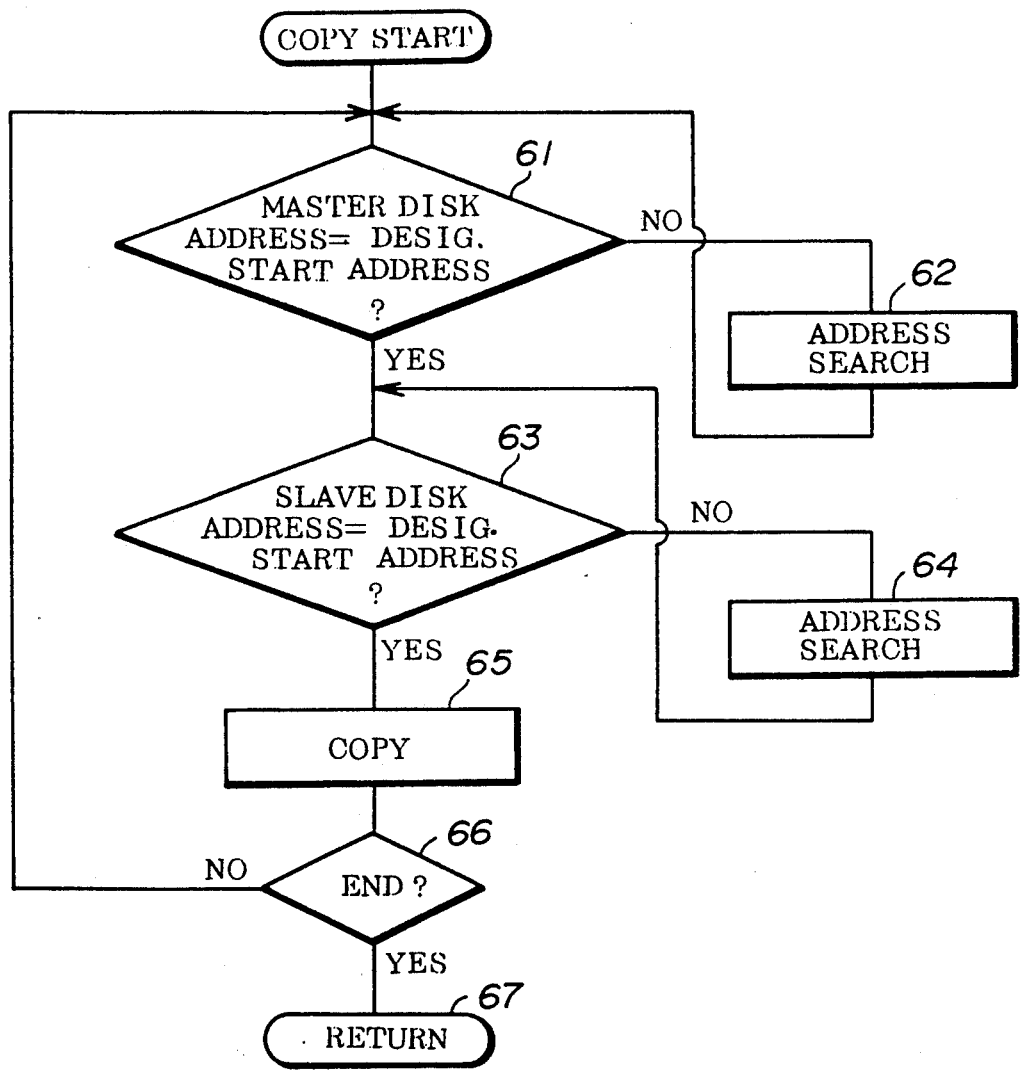
FIG. 5 is a flow chart for explaining the procedure of an essential part of the embodiment shown in FIG. 2.

The copy processing function in the step 35 carries out a copying procedure in accordance with the flow chart as shown in FIG. 5. In FIG. 5, in steps 61, 62, an address search is repeatedly performed until the current address of the master optical disk 76 accords with a designated starting track address in the master disk designation column in FIG. 7. Also, in steps 63, 64, an address search is repeatedly performed until the current address of the slave optical disk 77 accords with a designated starting track address in the slave disk designation column in FIG. 7. When the current addresses of the master and slave optical disks 76, 77 each accord with the designated starting track address, a recording of reproduced signals of the master optical disk 76 to the slave optical disk 77 starts in a step 65. During this recording procedure, a discrimination is made in a step 66 as to whether the current track address of the master optical disk 76 accords with a designated end track address in the master disk designation column of the screen in FIG. 7. If a track address accordance is reached, the copying procedure is ended in a step 67.

After the copy processing function is ended in the step 67 in FIG. 5, in a step 36 as shown in FIG. 2, a message is displayed by the disk editing system within the screen shown in FIG. 7, which message asks the operator whether the system termination is desired or not. If an answer to the message is inputted by the operator to indicate YES, then the disk editing system is terminated in a step 37. If the answer is inputted by the operator to indicate NO in the step 36, a copying processing is continued for copying a subsequent recorded area in the step 35.

In the copy processing which is carried out in the step 35 in FIG. 2, the maximum number of recorded areas which can be stored in the disk editing system is 120. When the recorded area is renewed, the master optical disk 76 is searched up to a track address being calculated by adding 1 to the end track address of the area number (120) of the final recorded area, and the disk editing system is in a master reference/retrieval mode from such a position of the master optical disk 76.

As described above, according to the present invention, it is possible to produce easily a duplicate disk storage medium which has exactly the same track pattern as that of the master disk storage medium in which recorded tracks and unrecorded tracks exist in a mixed fashion. On the basis of the track addresses, a recording or copying of information onto the slave disk storage medium is carried out, and a reproduced data in the slave disk storage medium can be made accurately. In addition, according to the present invention, it is possible to perform a fast feeding of the optical head. When the recording of data at tracks corresponding to the recorded tracks of the master disk storage medium is stopped. Therefore, a copying time required for the data recording onto the slave disk storage medium can be reduced remarkably when compared with that of the conventional data copying method.

Further, the present invention is not limited to the above described embodiment, and variations and modifications may be made without departing from the scope of the present invention.

What is claimed is:

1. A method of copying data from a master disk storage medium having plural sets of recorded tracks and plural sets of unrecorded tracks in a mixed manner onto a slave disk storage medium having unrecorded tracks only, said method comprising the steps of:

checking a starting track address and an end track address of each set of the recorded tracks in the master disk storage medium, said starting and end track addresses being used to control a copying or recording of data from each set of the recorded tracks in the master disk storage medium, and storing said starting and end track addresses of each set of the recorded tracks;

reproducing data from each et of the recorded tracks in the master disk storage medium from said starting track address to said end track address so that a reproduced signal is generated from said data for each set of the recorded tracks; and recording said reproduced signal onto the slave disk storage medium at its track addresses corresponding to said each starting and end addresses of the recorded tracks in the master disk storage medium for each set of the recorded tracks in the master disk storage medium, said recording of said reproduced signal being stopped at track addresses of the slave disk storage medium corresponding to addresses of the unrecorded tracks in the master disk storage medium, and tracks in the slave disk storage medium corresponding to the unrecorded tracks of master disk storage medium being skipped to a following track corresponding to a following recorded track in the master disk storage medium.

2. The method as claimed in claim 1, wherein said checking of the end track address in the master disk storage medium is performed when no prescribed signal is detected by reproducing a data recorded in each set of said recorded tracks.

3. The method as claimed in claim 1, wherein said checking of the starting track address in the master disk storage medium is performed when a prescribed signal is detected by reproducing a data recorded in each set of said recorded tracks.

4. The method as claimed in claim 1, wherein said checking of the end track address is carried out by reproducing each set of said recorded tracks in the master disk storage medium, detecting a prescribed signal from each set of said recorded tracks and storing the end track address only when no prescribed signal is detected.

5. The method as claimed in claim 1, wherein said checking of the starting track address is carried out by reproducing each set of said recorded tracks in the master disk storage medium, detecting a prescribed signal from each set of said recorded tracks and storing the starting track address when said prescribed signal is detected.

6. The method as claimed in claim 1, wherein said recording of said reproduced data signal onto the slave disk storage medium is carried out each time a track address of the slave disk storage medium accords with a track address of each set of said recorded tracks in the master disk storage medium, which track address is supplied after the starting track address and the end track address of each set of said recorded tracks in the master disk storage medium are checked and stored.

7. The method as claimed in claim 1, wherein said recording of said reproduced data signal onto the slave disk storage medium is stopped each time a track address of the slave disk storage medium accords with a track address of each set of said unrecorded tracks in the master disk storage medium, which track address is supplied after the starting track address and the end track address of each set of said recorded tracks in the master disk storage medium are checked and stored.

8. The method as claimed in claim 1, further comprising the step of moving at a fast feeding rate a head of a disk recording unit, said head performing said recording of said reproduced data signal on the slave disk storage medium, from an end track address of the slave disk storage medium corresponding to that of a recorded track in the master disk storage medium, where said recording onto the slave disk storage medium is stopped, to a next starting track address thereof corresponding to that of a next recorded track in the master disk storage medium.

* * * * *